UNITED STATES PATENT OFFICE.

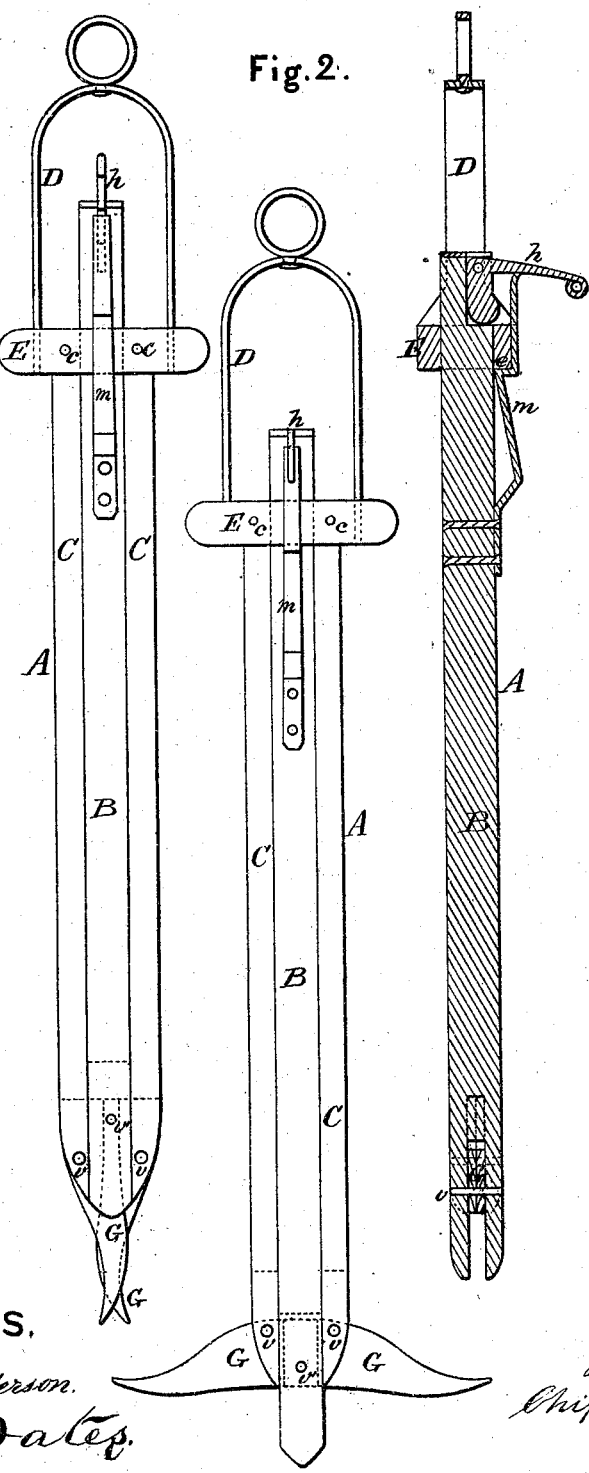

IRA E. SNYDER, OF WOODWARD, PENNSYLVANIA.

IMPROVEMENT IN HORSE HAY-FORKS.

Specification forming part of Letters Patent No. 143,192, dated September 23, 1873; application filed February 15, 1873.

*To all whom it may concern:*

Be it known that I, IRA E. SNYDER, of Woodward, in the county of Centre and State of Pennsylvania, have invented a new and valuable Improvement in Hay-forks; and I do hereby declare that the following is a full, clear, and exact description of the construction and operation of the same, reference being had to the annexed drawings making a part of this specification, and to the letters and figures of reference marked thereon.

Figure 1 of the drawings is a representation of a view of my fork with prongs closed. Fig. 2 is a view of my fork with prongs extended. Fig. 3 is a sectional view of my fork.

This invention has relation to hay-forks; and it consists in the construction and novel arrangement of the several parts hereinafter described and claimed.

In the accompanying drawings, the letter A designates the shank, consisting of the central bar B and the side bars C, the central bar being arranged to slide longitudinally between the side bars. D indicates the handle, which may be secured to the central bar or to the side bars. The latter construction is preferred, and is illustrated in the drawings. The handle is attached to the transverse guard E, to which the side bars C are secured by pivot-pins c, so that they will have some little lateral play; or, the side bars may be rigidly secured to the guard E if they are made of material possessing sufficient elasticity to admit of this play. The central bar B extends through the guard E, sliding freely within it. A spring-stop, m, is connected with the central bar, and is designed by engaging with the shoulder e of the guard or other projection to fix rigidly the position of this bar when it is pushed downward between the side bars to its farthest extent. A dog, h, or other suitable device is provided at the end of the central bar, which serves to release the guard from its engagement with the spring-stop when necessary. The ends of the side bars and central bar are slotted transversely for the reception of the prongs or blades G, each of which is pivoted to a side bar, and both together and to the central bar, the pivots v v' being arranged so that they will be in line with each other only at the half-throw of the prongs—that is to say, when they are neither fully opened or fully closed, the side bars being expanded from the central bar on each side. In this manner the pressure of the hay against the side bars serves to assist in keeping the blades G either open or closed. The ends of the side bars and central bar are rounded up and beveled on each side of the blades in order that there may be as little obstruction as possible caused thereby when the fork is introduced into the hay.

What I claim as new, and desire to secure by Letters Patent, is—

In a hay-fork having the side bars C, the central sliding bar B, and the folding prongs G, the locking devices, consisting of the spring stop m and the dog h, connected to the central bar B and shouldered guard E, substantially as shown and described.

In testimony that I claim the above I have hereunto subscribed my name in the presence of two witnesses.

IRA E. SNYDER.

Witnesses:
 SAMUEL BROWN,
 EMANUEL GUISEWITE.